(12) United States Patent
Kim et al.

(10) Patent No.: US 11,381,944 B2
(45) Date of Patent: Jul. 5, 2022

(54) SIGNAL TRANSMISSION METHOD FOR V2X COMMUNICATION IN WIRELESS COMMUNICATION SYSTEM AND DEVICE THEREFOR

(71) Applicant: LG Electronics Inc., Seoul (KR)

(72) Inventors: Youngtae Kim, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 4 days.

(21) Appl. No.: 16/325,556

(22) PCT Filed: Sep. 11, 2017

(86) PCT No.: PCT/KR2017/009951
§ 371 (c)(1),
(2) Date: Feb. 14, 2019

(87) PCT Pub. No.: WO2018/048273
PCT Pub. Date: Mar. 15, 2018

(65) Prior Publication Data
US 2019/0182643 A1    Jun. 13, 2019

Related U.S. Application Data

(60) Provisional application No. 62/393,077, filed on Sep. 11, 2016.

(51) Int. Cl.
*H04W 4/44* (2018.01)
*H04L 1/16* (2006.01)
(Continued)

(52) U.S. Cl.
CPC ............. *H04W 4/44* (2018.02); *H04L 1/1607* (2013.01); *H04L 5/0055* (2013.01);
(Continued)

(58) Field of Classification Search
CPC ...... H04W 4/44; H04W 16/28; H04L 1/1607; H04L 5/0055; H04L 5/0048; H04L 2001/0093
(Continued)

(56) References Cited

U.S. PATENT DOCUMENTS

2015/0023267 A1    1/2015  Lim et al.
2015/0049732 A1    2/2015  Xue et al.
(Continued)

OTHER PUBLICATIONS

R1-164057: 3GPP TSG RAN WG1 Meeting #85, Nanjing, China, May 23-27, 2016, Huawei, HiSilicon, "Uu DL enhancements for VX," pp. 1-5.
(Continued)

*Primary Examiner* — Kwang B Yao
*Assistant Examiner* — Xuan Lu
(74) *Attorney, Agent, or Firm* — Dentons US LLP

(57) ABSTRACT

The present invention relates to a method and device for transmitting a vehicle-to-everything (V2X) signal by a V2X transmission terminal in a wireless communication system. More particularly, the present invention comprises the steps of: broadcasting/multicasting a V2X signal to a plurality of reception terminals; and checking acknowledgement/negative-acknowledgement (ACK/NACK) for the plurality of reception terminals in an ACK/NACK resource region specifically associated with the V2X signal.

8 Claims, 10 Drawing Sheets

(51) Int. Cl.
  *H04L 5/00* (2006.01)
  *H04W 16/28* (2009.01)
  *H04L 1/00* (2006.01)
  *H04W 4/40* (2018.01)

(52) U.S. Cl.
  CPC ........... *H04W 16/28* (2013.01); *H04L 5/0048* (2013.01); *H04L 2001/0093* (2013.01)

(58) Field of Classification Search
  USPC ......................................................... 370/329
  See application file for complete search history.

(56) References Cited

U.S. PATENT DOCUMENTS

| | | | |
|---|---|---|---|
| 2015/0085735 A1* | 3/2015 | Shelby | H04L 65/80 370/312 |
| 2015/0131556 A1* | 5/2015 | Kalhan | H04L 1/1607 370/329 |
| 2015/0334693 A1* | 11/2015 | Lu | H04W 72/0406 370/329 |
| 2016/0173239 A1* | 6/2016 | Kim | H04L 1/1812 370/329 |
| 2017/0111894 A1* | 4/2017 | Chen | H04W 76/27 |
| 2017/0201300 A1* | 7/2017 | Parkvall | H04B 7/0456 |
| 2017/0288886 A1* | 10/2017 | Atari | H04L 65/1016 |
| 2017/0364942 A1* | 12/2017 | Arora | H04W 4/80 |
| 2018/0227882 A1* | 8/2018 | Freda | H04W 72/085 |
| 2018/0367261 A1* | 12/2018 | Gonzalves Serrano | H04L 1/0027 |
| 2019/0007974 A1* | 1/2019 | Nguyen | H04W 4/70 |
| 2019/0052411 A1* | 2/2019 | Chae | H04L 1/08 |
| 2019/0288809 A1* | 9/2019 | Iyer | H04L 1/1893 |
| 2019/0312684 A1* | 10/2019 | Christoffersson | H04L 43/16 |

OTHER PUBLICATIONS

R1-164537: 3GPP TSG RAN WG1 Meeting #85, Nanjing, China, May 23-27, 2016, LG Electronics, "Discussion an UE feedback for DL multicast/broadcast," pp. 1-5.

* cited by examiner

FIG. 2
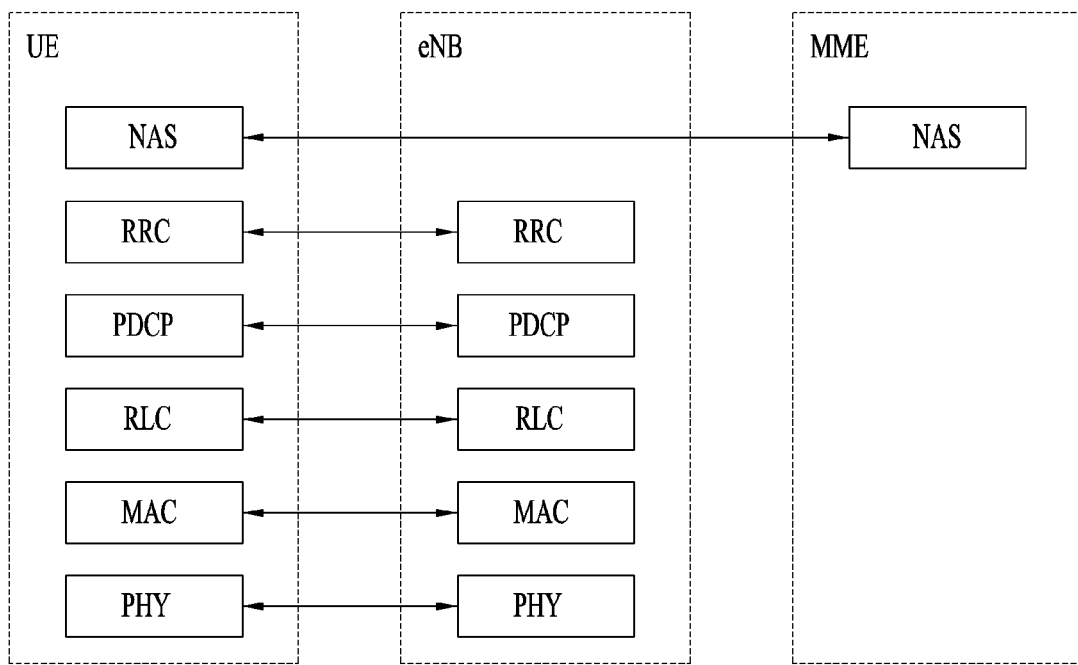
(A) CONTROL-PLANE PROTOCOL STACK
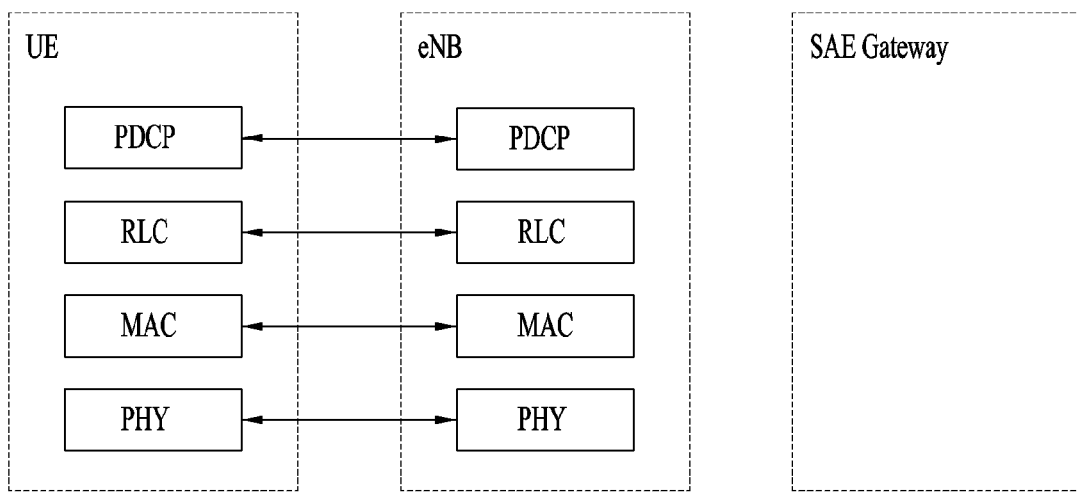
(B) USER-PLANE PROTOCOL STACK

FIG. 8
(a)
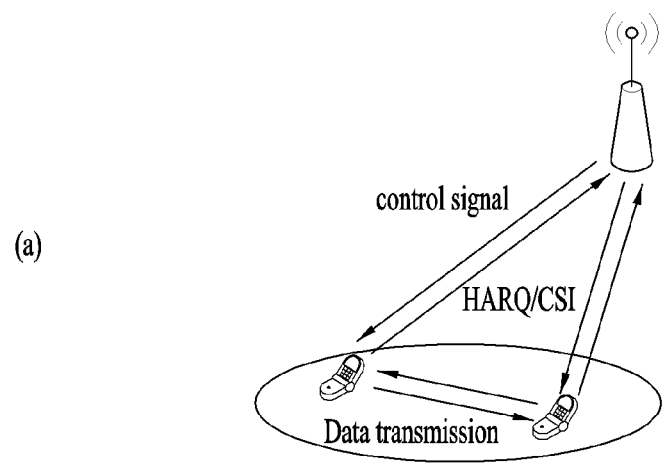
(b)
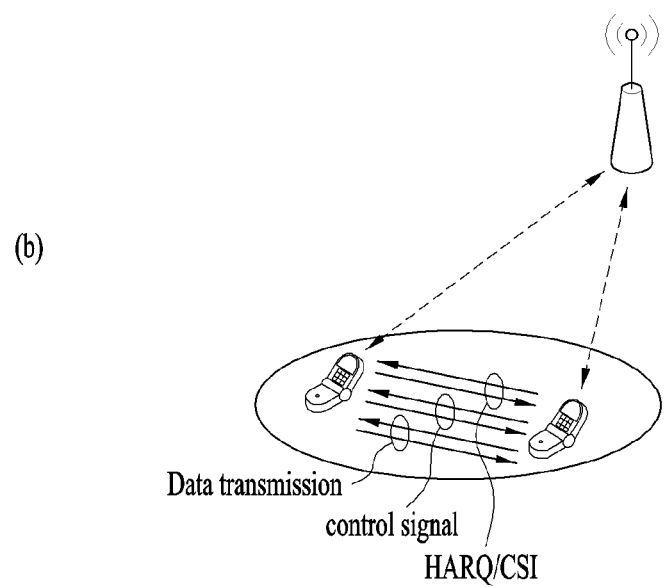

SIGNAL TRANSMISSION METHOD FOR V2X COMMUNICATION IN WIRELESS COMMUNICATION SYSTEM AND DEVICE THEREFOR

This application is a 35 USC § 371 national stage entry of international application no. PCT/KR2017/009951 filed on Sep. 11, 2017, and claims priority to U.S. provisional application No. 62/393,077 filed on Sep. 11, 2016, all of which are hereby incorporated by reference in their entireties as if fully set forth herein.

TECHNICAL FIELD

The present invention relates to a wireless communication system, and more particularly, to a method of transmitting a signal for V2X communication in a wireless communication system and apparatus therefor.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

DISCLOSURE OF THE INVENTION

Technical Task

Based on the aforementioned discussion, the technical task of the present invention is to propose a method of transmitting a signal for V2X communication in a wireless communication system and apparatus therefor.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In one technical aspect of the present invention, provided herein is a method of transmitting a Vehicle-to-Everything (V2X) signal by a V2X transmitting user equipment in a wireless communication system, the method including transmitting the V2X signal to a multitude of receiving user equipments by broadcast/multicast and checking ACK/NACK for a multitude of the receiving user equipments in an Acknowledgement/Negative-Acknowledgement (ACK/NACK) resource region specifically associated with the V2X signal.

Preferably, the checking the ACK/NACK may include checking whether a reference signal is transmitted in the ACK/NACK resource region. The reference signal may be transmitted by a multitude of the receiving user equipments using a same sequence and a channel of a NACK signal may be based on a sum of channels of the receiving user equipments transmitting the NACK signal among a multitude of the receiving user equipments. A multitude of the receiving user equipments may be configured to transmit the reference signal using N NACK sequences (where N is a natural number).

Preferably, the checking the ACK/NACK may include determining the NACK when the ACK/NACK Signal has a strength equal to or greater than a threshold value if a reference signal is not transmitted in the ACK/NACK resource region. And, beamforming precoding based on a sounding of the V2X signal may be applied to the ACK/NACK signal.

Preferably, the ACK/NACK signal is transmitted based on Single Frequency Network (SFN) and the ACK/NACK Signal is transmitted on resource elements within a frequency associated with the SFN in form of a comb. If a sum of ACK/NACK signal strengths of the ACK/NACK signal transmitted resource elements among the resource elements is greater than a sum of signal strengths for the rest of the resource elements among the resource elements, the NACK may be determined.

Preferably, the ACK/NACK may be configured to be transmitted through a specific resource element divided on a frequency axis in proportion to a multitude of the receiving user equipments in the ACK/NACK resource region.

In another technical aspect of the present invention, provided herein is a Vehicle-to-Everything (V2X) transmitting user equipment transmitting a V2X signal in a wireless communication system, the V2X transmitting user equipment including a radio frequency unit and a processor configured to control signal transmission/reception by being combined with the radio frequency unit, wherein the processor is further configured to transmit the V2X signal to a multitude of receiving user equipments by broadcast/multicast and check ACK/NACK for a multitude of the receiving user equipments in an Acknowledgement/Negative-Acknowledgement (ACK/NACK) resource region specifically associated with the V2X signal.

Advantageous Effects

According to an embodiment of the present invention, signal transmission for V2X communication can be efficiently performed in a wireless communication system.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 2 illustrates control plane and user plane structures of a radio interface protocol between a UE and an E-UTRAN on the basis of the 3GPP wireless access network standard.

FIG. 8 is a reference diagram to describe D2D (UE-to-UE) communication.

BEST MODE FOR INVENTION

Figure 1:
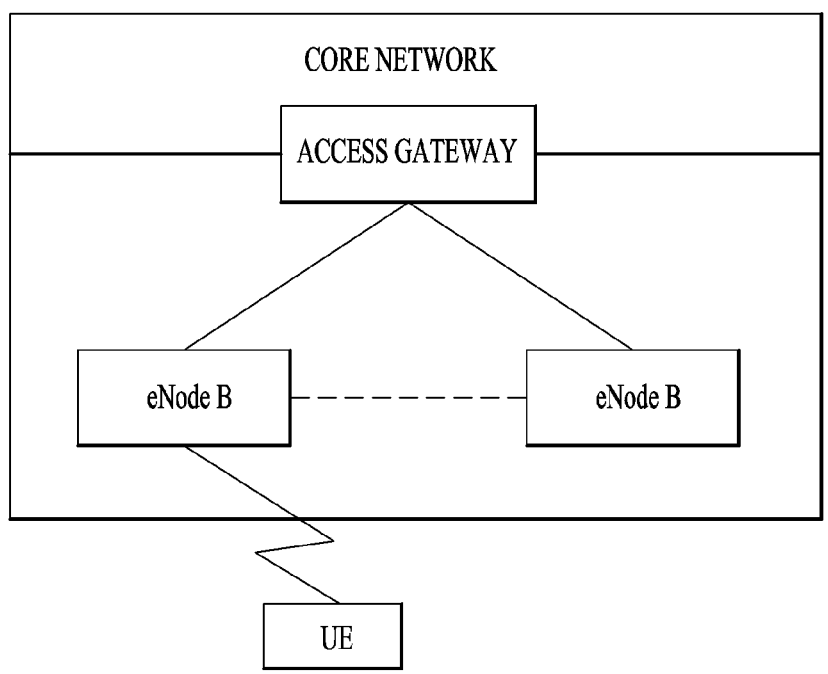
FIG. 1 schematically illustrates an E-UMTS network structure as an example of a wireless communication system.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, reconfiguration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
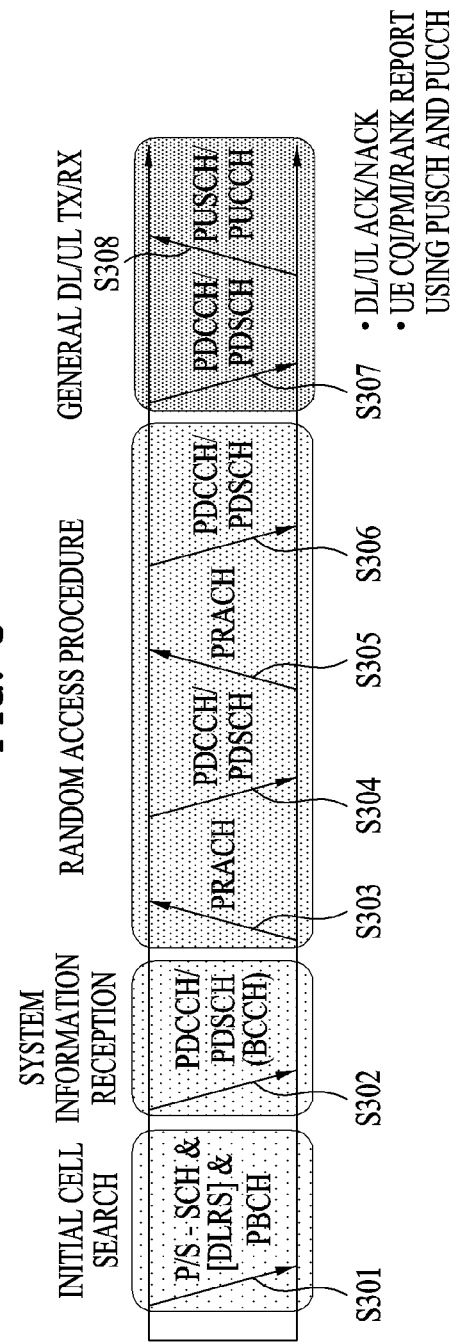
FIG. 3 illustrates physical channels used in a 3GPP system and a general signal transmission method using the same.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4:
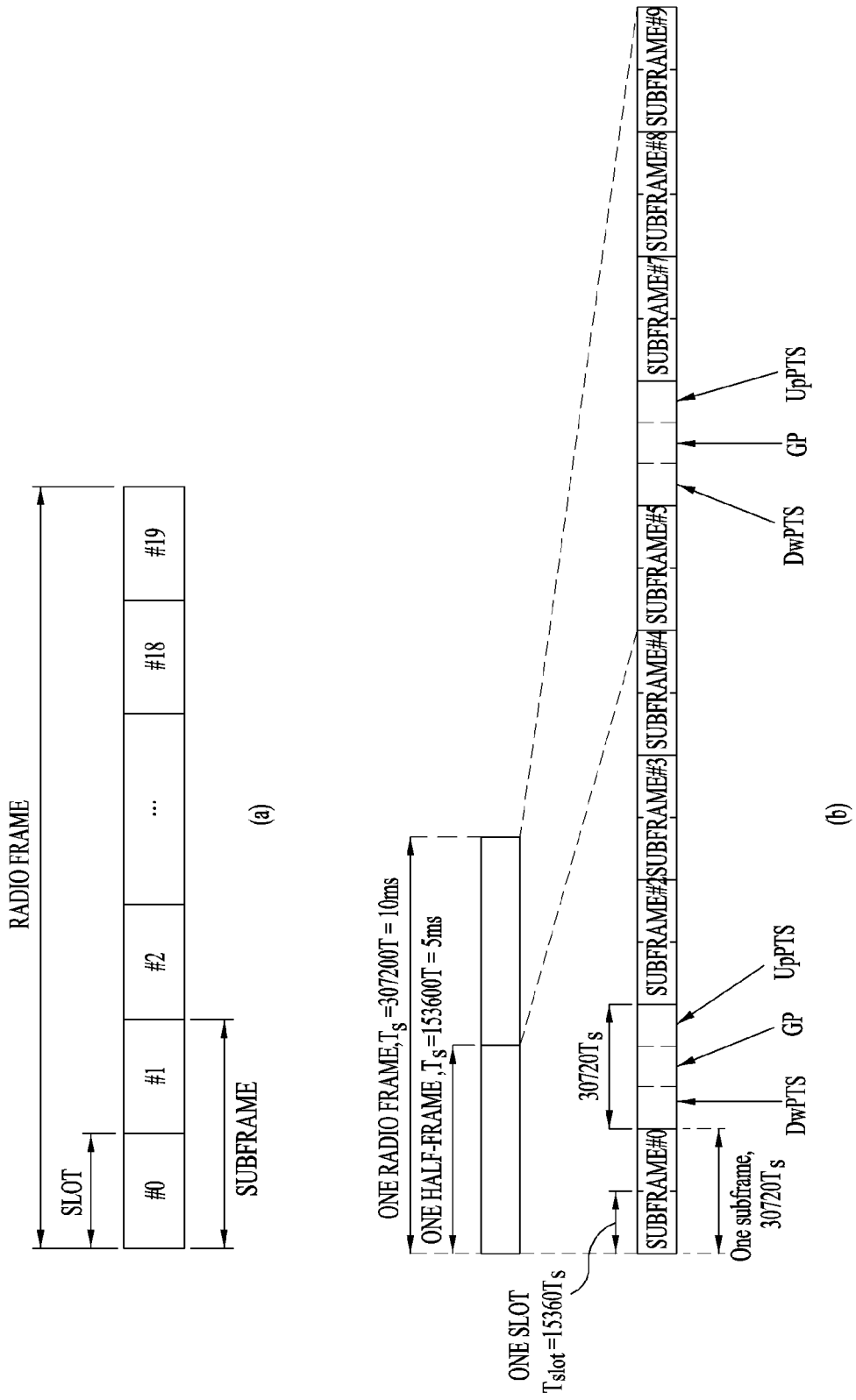
FIG. 4 illustrates a radio frame structure used in LTE.

FIG. 4 is a diagram illustrating a structure of a radio frame used in an LTE system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical downlink control channel (PDCCH), and the other OFDM symbols may be allocated to a physical downlink shared channel (PDSCH).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the user equipment. The UpPTS is used for channel estimation at the base station and uplink transmission synchronization of the user equipment. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Configuration of the special subframe is defined in the current 3GPP standard document as illustrated in Table 1 below. Table 1 illustrates the DwPTS and the UpPTS in case of $T_s=1/(15000 \times 2048)$, and the other region is configured for the guard period.

In the above Table 2, D means the downlink subframe, U means the uplink subframe, and S means the special subframe. Also, Table 2 also illustrates a downlink-uplink switching period in the uplink/downlink subframe configuration of each system.

The structure of the aforementioned radio frame is only exemplary, and various modifications may be made in the number of subframes included in the radio frame, the number of slots included in the subframe, or the number of symbols included in the slot.

Figure 5:
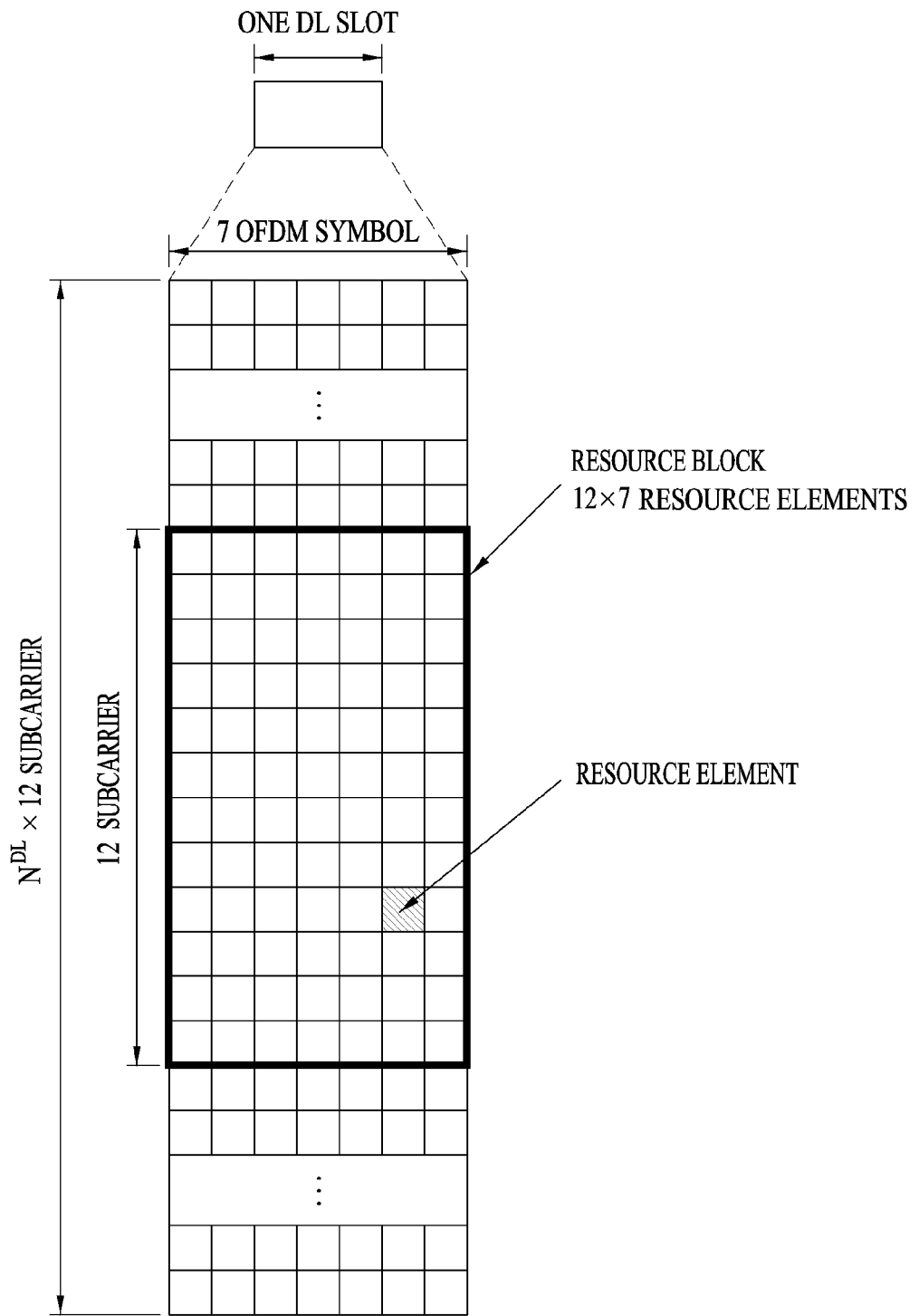
FIG. 5 illustrates a resource grid for a downlink slot.

FIG. 5 illustrates a resource grid for a downlink slot.

Referring to FIG. 5, a DL slot includes $N\_symb^{DL}$ OFDM symbols in a time domain and $N\_RB^{DL}$ resource blocks in a frequency domain. Since each of the resource blocks includes $N\_SC^{RB}$ subcarriers, the DL slot includes $N\_RB^{DL} \times N\_SC^{RB}$ subcarriers in the frequency domain. Although FIG. 5 shows an example in which the DL slot includes 7 OFDM symbols and the resource block includes 12 subcarriers, the present invention is not limited thereto. For instance, the number of OFDM symbols included in the DL slot can vary depending to a length of a cyclic prefix (CP).

Each element on a resource grid is referred to as a resource element (RE) and a single resource element is indicated by one OFDM symbol index and one subcarrier index. A single RB is configured with $N\_symb^{DL} \times N\_SC^{RB}$ resource elements. The number ($N\_RB^{DL}$) of

TABLE 1

| | Normal cyclic prefix in downlink | | | Extended cyclic prefix in downlink | | |
|---|---|---|---|---|---|---|
| | | UpPTS | | | UpPTS | |
| | | Normal | Extended | | | |
| Special subframe configuration | DwPTS | cyclic prefix in uplink | cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

In the meantime, the structure of the type 2 radio frame, that is, uplink/downlink configuration (UL/DL configuration) in the TDD system is as illustrated in Table 2 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D | resource blocks included in the DL slot depends on a DL transmission bandwidth configured in a cell.

Figure 6:
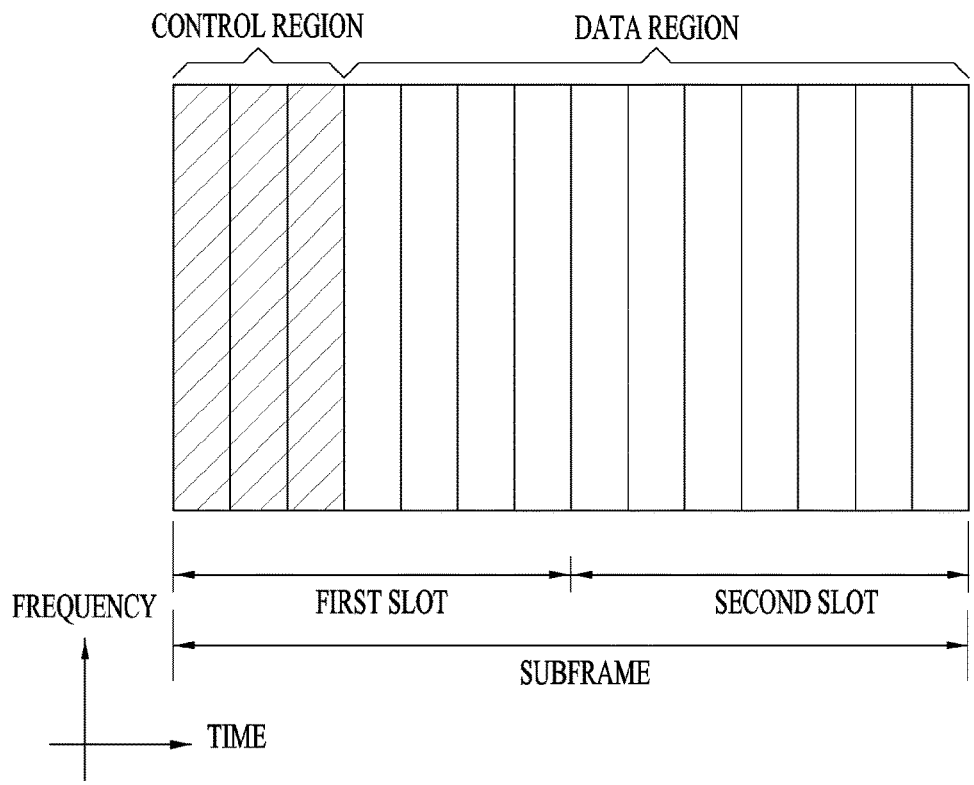
FIG. 6 illustrates a structure of a downlink radio frame used in an LTE system.

FIG. 6 illustrates a structure of a downlink radio frame.

Referring to FIG. 6, up to 3 (or 4) OFDM symbols located at a head part of a first slot of a subframe correspond to a control region to which a control channel is assigned. And, the rest of OFDM symbols correspond to a data region to which PDSCH (physical downlink shared channel) is assigned. For example, DL control channels used in the LTE system may include a PCFICH (physical control format indicator channel), a PDCCH (physical downlink control channel), a PHICH (physical hybrid ARQ indicator channel) and the like. The PCFICH is transmitted on a first OFDM symbol of a subframe and carries information on the number of OFDM symbols in the subframe used for control channel transmission. The PHICH carries an HARQ ACK/NACK (hybrid automatic repeat request acknowledgment/negative-acknowledgment) signal in response to UL transmission.

Control information transmitted on the PDCCH is called DCI (downlink control information). The DCI includes resource allocation information and other control information for a user equipment or a user equipment group. For instance, the DCI may include UL/DL scheduling information, UL transmission (Tx) power control command and the like.

The PDCCH carries transmission format and resource allocation information of a DL-SCH (downlink shared channel), transmission format and resource allocation information of a UL-SCH (uplink shared channel), paging information on a PCH (paging channel), system information on a DL-SCH, resource allocation information of a higher-layer control message such as a random access response transmitted on a PDSCH, a Tx power control command set for individual user equipments in a user equipment group, a Tx power control command, activation indication information of a VoIP (voice over IP) and the like. A plurality of PDCCHs may be transmitted in a control region. A user equipment can monitor a plurality of PDCCHs. The PDCCH is transmitted on aggregation of one or more consecutive CCEs (control channel elements). In this case, the CCE is a logical assignment unit used in providing the PDCCH with a coding rate based on a radio channel state. The CCE corresponds to a plurality of REGs (resource element groups). The PDCCH format and the number of PDCCH bits are determined depending on the number of CCEs. A base station determines the PDCCH format in accordance with DCI to be transmitted to a user equipment and attaches CRC (cyclic redundancy check) to control information. The CRC is masked with an identifier (e.g., RNTI (radio network temporary identifier)) in accordance with an owner or a purpose of use. For instance, if a PDCCH is provided for a specific user equipment, CRC may be masked with an identifier (e.g., C-RNTI (cell-RNTI)) of the corresponding user equipment. If a PDCCH is provided for a paging message, CRC may be masked with a paging identifier (e.g., P-RNTI (paging-RNTI)). If a PDCCH is provided for system information (particularly, SIC (system information block)), CRC may be masked with an SI-RNTI (system information-RNTI). In addition, if a PDCCH is provided for a random access response, CRC may be masked with an RA-RNTI (random access-RNTI).

Figure 7:
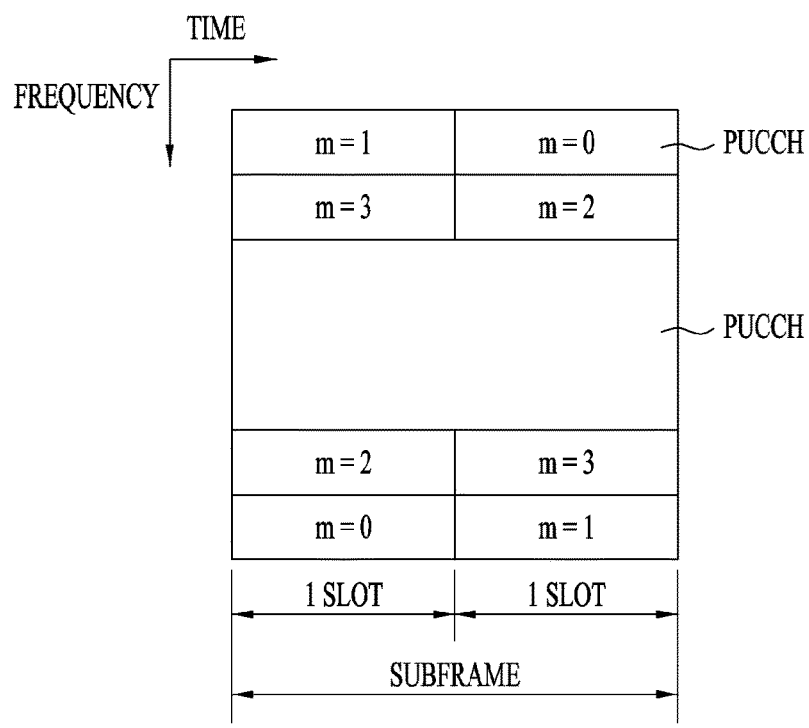
FIG. 7 illustrates a structure of an uplink radio frame used in an LTE system.

FIG. 7 illustrates a structure of an uplink subframe used in an LTE system.

Referring to FIG. 7, an uplink subframe includes a plurality (e.g., 2 slots) of slots. Each of the slots may include a different number of SC-FDMA symbols depending on a length of CP. The UL subframe may be divided into a data region and a control region in the frequency domain. The data region includes a PUSCH and is used to transmit such a data signal as audio and the like. The control region includes a PUCCH and is used to transmit UCI (uplink control information). The PUCCH includes an RB pair located at both ends of the data region on a frequency axis and is hopped on a slot boundary.

The PUCCH can be used to transmit the following control information.
SR (scheduling request): This is information used to request a UL-SCH resource and is transmitted using an OOK (on-off keying) scheme.
HARQ ACK/NACK: This is a response signal in response to a DL data packet on a PDSCH and indicates whether the DL data packet has been successfully received. 1-bit ACK/NACK is transmitted as a response to a single downlink codeword and 2-bit ACK/NACK is transmitted as a response to two downlink codewords.
CSI (channel state information): This is feedback information on a downlink channel. The CSI includes a channel quality indicator (CQI). MIMO (multiple input multiple output) related feedback information includes a rank indicator (RI), a precoding matrix indicator (PMI), a precoding type indicator (PTI) and the like. 20-bit is used in each subframe.

The amount of control information (UCI) that a user equipment can transmit in a subframe depends on the number of SC-FDMA symbols available for transmission of the control information. The SC-FDMA symbols available for the transmission of the control information correspond to the rest of SC-FDMA symbols except SC-FDMA symbols used for transmitting a reference signal in the subframe. In case of a subframe in which a sounding reference signal (SRS) is configured, the last SC-FDMA symbol of the subframe is excluded from the SC-FDMA symbols available for the transmission of the control information. The reference signal is used for coherent detection of a PUCCH.

Hereinafter, D2D (UE-to-UE) communication will be described.

A D2D communication scheme can be mainly classified as a scheme supported by a network/coordination station (e.g., base station) and a scheme not supported by the network/coordination station.

Referring to FIG. 8, FIG. 8 (a) illustrates a scheme in which the network/coordination station intervenes in transmission and reception of control signals (e.g., grant message), HARQ, channel state information, etc. and user equipments that perform D2D communication transmit and receive data only. On the other hand, FIG. 8 (b) illustrates a scheme in which the network provides minimum information (e.g., D2D connection information available in a corresponding cell) only but the user equipments that perform D2D communication establish links to transmit and receive data.

Figure 9:
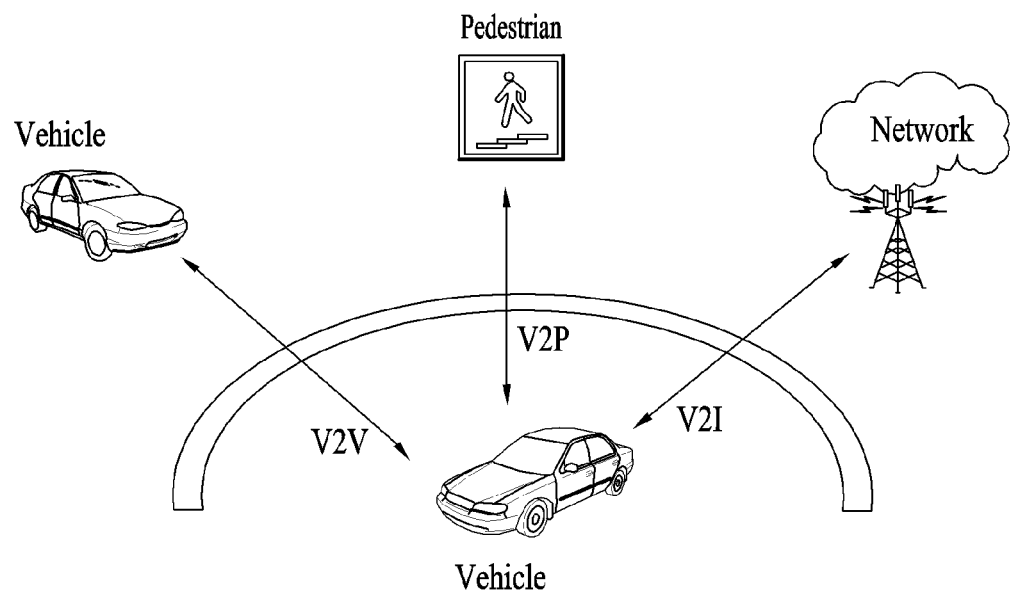
FIG. 9 is a reference diagram to describe a V2V scenario.

FIG. 9 is a diagram illustrating a V2X (vehicle to everything) communication environment.

If a vehicle accident occurs, many lives are lost, and serious property damage is caused. Thus, the demand for a technology capable of securing safety of pedestrians as well as safety of people in a vehicle has been increased. In addition, a technology based on hardware and software dedicated to the vehicle has been grafted onto the vehicle.

Recently, the LTE-based V2X (vehicle-to-everything) communication technology, which has been evolved from 3GPP, reflects the tendency in which the information technology (IT) is grafted onto the vehicle. A connectivity function is applied to some kinds of vehicles, and efforts are continuously made to research and develop vehicle-to-vehicle (V2V) communication, vehicle-to-infrastructure (V2I) communication, vehicle-to-pedestrian (V2P) communication, and vehicle-to-network (V2N) communication with the evolution of communication functions.

According to V2X communication, a vehicle consistently broadcasts information on its own locations, speeds, directions, etc. After receiving the broadcasted information, a nearby vehicle utilizes the information for accident prevention by recognizing movements of other adjacent vehicles.

That is, in a similar manner that an individual person carries a user equipment such as a smartphone, a smartwatch or the like, a specific type of user equipment (UE) can be installed in each vehicle. Here, a UE installed in a vehicle means a device that actually receives communication services from a communication network. For example, the UE installed in the vehicle can be accessed to an eNB in E-UTRAN and provided with communication services.

However, there are various items that should be considered for a process for implementing V2X communication in a vehicle. This is because astronomical costs are required for the installation of traffic safety facilities such as a V2X base station and the like. That is, to support V2X communication on all roads where the vehicle can move, it is necessary to install hundreds or thousands of V2X base stations or more. Moreover, since each network node accesses the Internet or a centralized control server using a wired network basically for stable communication with a server, installation and maintenance costs for the wired network are also high.

Hereinafter, resource allocation for performing V2X communication in the present invention is described. Although the present invention is described by being limited to a V2X scenario for clarity of the description, the present invention is applicable to other communication systems such as Device-to-Device (D2D) communication.

Figure 10:
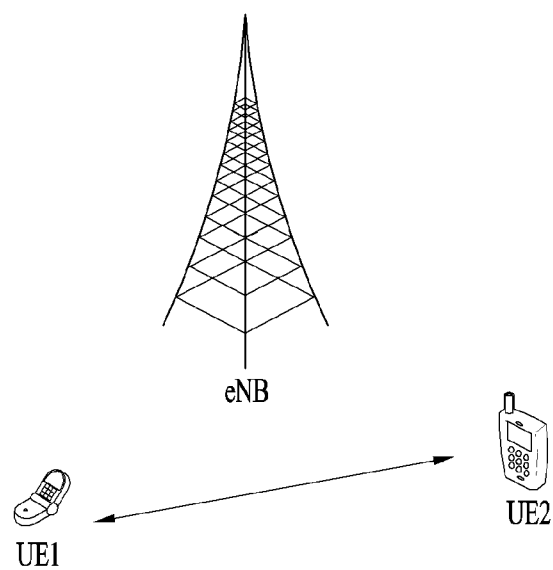
FIG. 10 and FIG. 11 are reference diagrams to describe a resource pool on a D2D scenario.

FIG. 10 is a reference diagram to describe UE-to-UE direct communication. When a UE performs communication with another UE using a direct wireless channel, as shown in FIG. 10, the present invention proposes a method of determining a resource to use for communication. This can be named UE-to-UE direct signal transmission/reception or Device-to-Device (D2D) communication, and further named a sidelink to be distinguished from Downlink (DL) and Uplink (UL) of the existing cellular communication. Furthermore, communication among multiple devices may be named Vehicle-to-Vehicle (V2V) communication in association with vehicles. Hence, although a UE means a user's UE (or car), if a network equipment such as an eNB transmits/receives a signal according to a UE-to-UE communication methodology, the network equipment can be regarded as a sort of UE to which the present invention is applicable. Moreover, an eNB can receive a D2D signal transmitted by a UE. Furthermore, a signal transmitting/receiving method of a UE designed for D2D transmission is applicable to an operation for a UE to transmit data to an eNB.

In the following description, UE1 may operate in a manner of selecting a resource unit corresponding to a specific resource from a resource pool meaning a set of a series of resources and transmitting a D2D signal using the corresponding resource unit. UE2 that is an Rx UE may receive a configuration of a resource pool for the UE1 to transmit a D2D signal and detect a signal of the UE1 within the corresponding resource pool. Here, if the UE1 is in a connection range of a base station, the UE1 can be informed of the resource pool by the base station. If the UE1 is out of the connection range of the base station, the UE1 may be informed of the resource pool by another UE or the resource pool may be determined as a previously determined resource. Generally, a resource pool is configured in a plurality of resource units. Each UE may select a single or a plurality of resource units and use the selected resource unit(s) for D2D signal transmission of its own.

Figure 11:
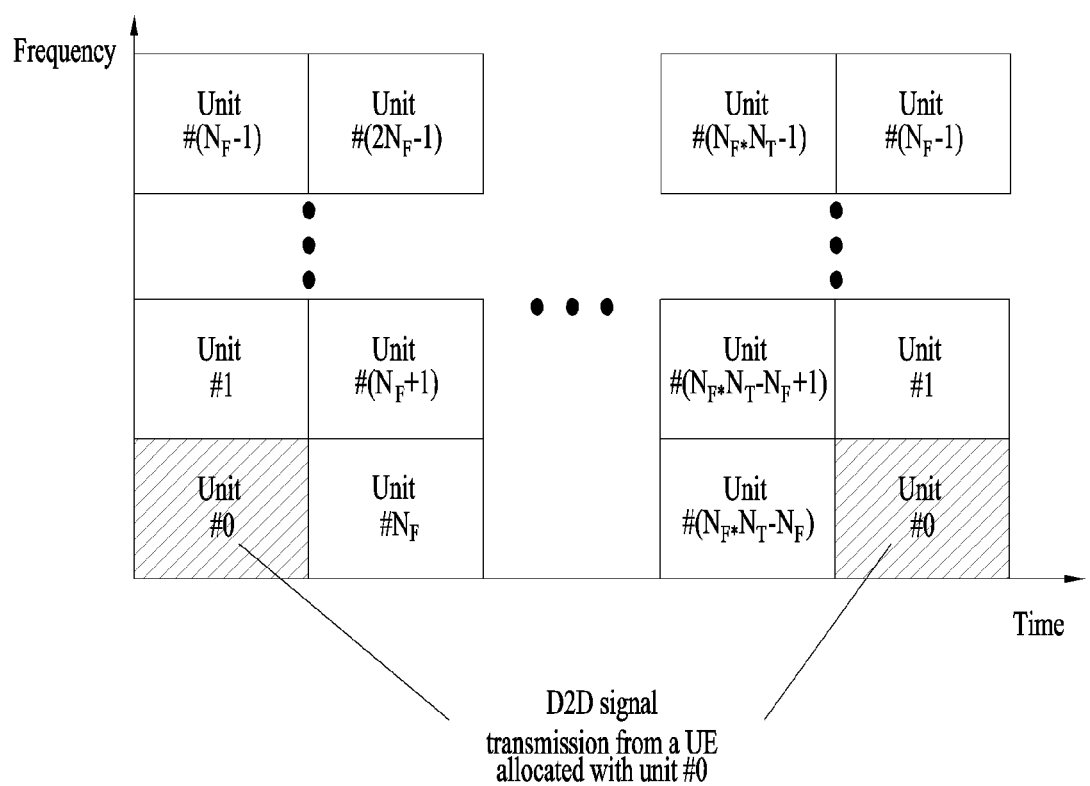

FIG. 11 shows one example of a configuration of resource unit. FIG. 11 illustrates a case that total NF*NT resource units are defined in a manner of dividing a full frequency resource into NF units and dividing a full time resource into NT units. In FIG. 11, a corresponding resource pool is repeated every NT subframes. Typically, as shown in FIG. 11, a single resource unit may appear in a manner of being repeated periodically. Or, an index of a physical resource unit, to which one logical resource unit is mapped to obtain a diversity effect in a time or frequency dimension, may change in a predetermined pattern according to a time. In such a resource unit structure, a resource pool may mean a set of resource units usable for a transmission by a UE intending to transmit a D2D signal.

Furthermore, a resource pool can be subdivided into various types. First of all, a resource pool can be divided according to a content of a transmitted D2D signal in each resource pool. For example, a content of a D2D signal can be classified as follows. And, a separate resource pool may be configured for each content.

Scheduling Assignment (SA) (or sidelink control channel): Signal including information such as a location of a resource used for transmission of a following D2D data channel by each transmitting (Tx) UE, a Modulation and Coding Scheme (MCS) required for demodulation of a data channel, an MIMO transmission methodology and the like. Such an SA signal can be transmitted on the same resource unit by being multiplexed with D2D data. In this case, an SA resource pool may mean a resource pool configured with a resource on which an SA is transmitted by being multiplexed with D2D data.

D2D data channel (sidelink shared channel): A resource pool configured with a resource used in transmitting user data by a Tx UE using a resource designated through SA. If a transmission on the same resource unit by being multiplexed with D2D data is possible, only a D2D data channel of a type except SA information is transmitted in a resource pool for the D2D data channel. So to speak, a resource element used in transmitting SA information on an individual resource unit within an SA resource pool is still used to transmit D2D data in a D2D data channel resource pool.

Discovery message (or sidelink discovery channel): A resource pool for a message through which a Tx UE enables an adjacent UE to discover the Tx UE itself by transmitting information such as an ID of the Tx UE and the like.

Synchronization signal/channel (or, sidelink synchronization signal, sidelink broadcast channel): A resource pool for a signal/channel to achieve an object that a Tx UE transmits a synchronization signal and information related to synchronization to enable an Rx (receiving) UE to match up time/frequency synchronization with that of the Tx UE.

Although SA and data may be use a resource pool separated on a subframe, if a UE can simultaneously transmit SA and data in a single frame, two types of resource pools can be configured in the same subframe.

Moreover, in case that the aforementioned D2D signal content is identical, a different resource pool is usable according to a transmission/reception attribute of the D2D signal. For example, despite the same D2D data channel or discovery message, it can be divided into a different resource pool again depending on a transmission timing determining methodology (whether a D2D signal is transmitted at a reception timing of a synchronization reference signal, whether a D2D signal is transmitted by applying a constant timing advance at a repletion timing of a synchronization reference signal, etc.), a resource allocation methodology (e.g., whether a transmission resource of an individual signal is designated to an individual Tx UE by an eNB, or whether an individual Tx UE selects an individual signal transmission resource from a resource pool by itself), a signal format (e.g., the number of symbols occupied in a single subframe by each D2D signal, the number of subframes used for transmission of a single D2D signal), a signal strength from an eNB, a transmit power level of a D2D UE and the like.

For clarity of description, a method for an eNB to directly indicate a transmission resource of a D2D Tx UE in D2D communication is defined as Mode 1. And, a method for a UE to directly select a transmission resource, when a transmission resource region is configured in advance or an eNB designates a transmission resource region, is defined as Mode 2. In case of D2D discovery, a case that an eNB directly indicates a resource is defined as Type 2. And, a case that a UE directly selects a transmission resource from a previously configured resource region or a resource region indicated by an eNB is defined as Type 1.

Moreover, as described above, D2D may be called sidelink, SA may be called Physical Sidelink Control Channel (PSCCH), D2D synchronization signal may be called Sidelink Synchronization Signal (SSS), control channel carrying most basic information, which is transmitted together with SSS before D2D communication, may be called Physical Sidelink Broadcast Channel (PSBCH) or Physical D2D Synchronization Channel (PD2DSCH).

Furthermore, a signal for a specific UE to announce that it is located nearby (here, ID of the specific UE may be included in this signal) or such a channel may be called Physical Sidelink Discovery Channel (PSDCH).

According to Rel. 12 on LTE system, only a D2D communication UE transmits PSBCH together with SSS in D2D, whereby measurement of SSS is performed using DMRS of PSBCH. An out-coverage UE measures DMRS of PSBCH and then determines whether to become a synchronization source by measuring RSRP of this signal and the like.

Moreover, in case of V2X communication, a control channel and a data channel are regarded as existing like D2D. Thus, when there exist a control channel and a data channel associated with the control channel, assume a situation that several vehicles come in and transmit periodic messages. Assuming that a vehicle is a UE, the UE can obtain resources location of the currently transmitted messages by decoding a currently transmitted control channel or performing energy sensing of a data channel And, the UE may further obtain resource locations that will be transmitted by Tx UEs.

Based on the aforementioned contents, ACK/NACK transmission design for broadcasting or multicasting transmission in V2X proposed by the present invention is described as follows. For clarity, the following description is made by focusing on V2X. Yet, the present invention shall be applicable to other broadcasting or multicasting systems.

In 5G new RAT, ACK/NACK based HARQ system is considered for V2X technology. Basically, in the ACK/NACK based HARQ system, when a Tx end transmits data, if an Rx detects an error of the data, the Rx transmits NACK. If determining there is no error, the Rx end transmits ACK. Accordingly, if the Tx end receives the NACK transmission, the Tx end performs retransmission. Thus, this technology can raise reliability of an Rx UE.

The HARQ system has the advantage of using resources efficiently as well as the effect of raising reliability. For example, in case of using a fixed retransmission for high reliability, a resource corresponding to the retransmission number should be always reserved. Yet, it is advantageous in that a resource can be efficiently used in case of performing a retransmission only for a case of transmitting NACK. For example, when a data transmission error rate is $10^{-2}$, assuming that $10^{-4}$ should be achieved, if the retransmission number is fixed, transmission may need to be always performed twice at least. Yet, in case of using ACK/NACK based HARQ, since it is enough to perform a retransmission once only out of 100 times in a first data transmission, it can be observed that a lot of resources can be saved.

Furthermore, in V2X transmission, a broadcast transmission and a multicast transmission are largely considered. For example, there are a broadcast message transmission for road public safety and a multicast message transmission for a platooning service. In these two cases, two or more Rx UEs are considered. Hence, considering the related art ACK/NACK based HARQ, a new access to an ACK/NACK resource may be necessary.

Therefore, regarding an ACK/NACK resource, according to the present invention, the ACK/NACK resource is allocated or needs to be allocated in the same frequency region as a frequency region occupied by data transmitted by a Tx UE basically. When a Tx UE transmits data by estimating a vacant resource in a manner of performing listen-before-talk or a sensing operation through resource measurement before transmitting the data, if an ACK/NACK resource is allocated in a frequency region estimated as vacant, it will be more efficient in avoiding interference.

Figure 12:
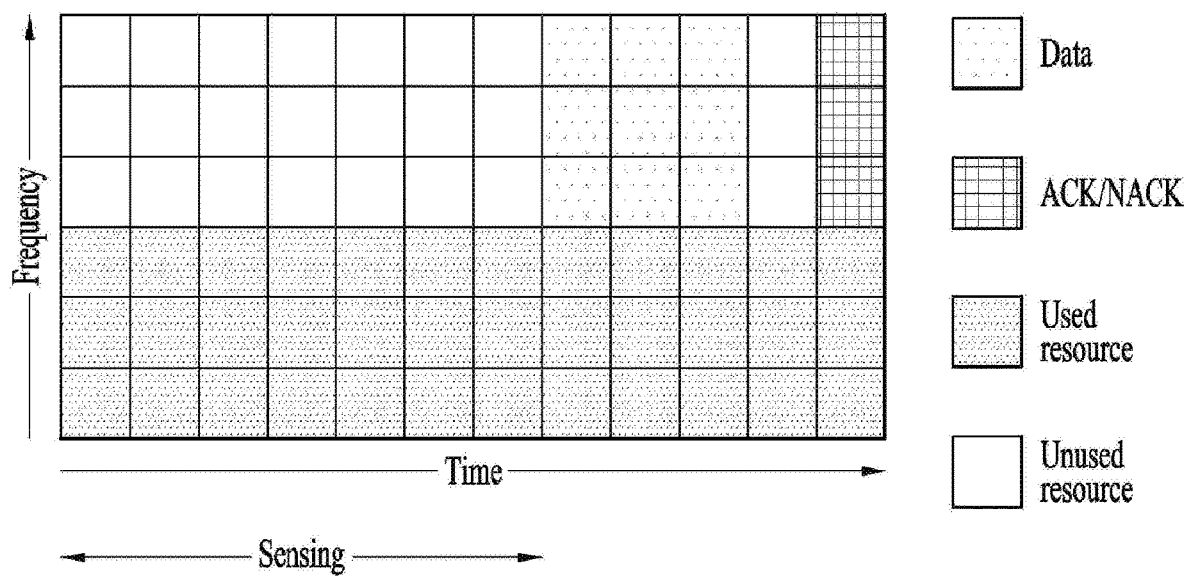
FIG. 12 is a reference diagram to describe a resource region for assigning ACK/NACK for broadcast/multicast for V2X communication according to one embodiment of the present invention.

For example, referring to FIG. 12, after a prescribed interval has been sensed before transmitting data, data is transmitted in a vacant frequency region. In doing so, as an ACK/NACK resource is disposed in the same frequency region in which the data is transmitted, both of the data and the ACK/NACK can avoid interference caused by a currently used resource.

Namely, in aspect of broadcast or multicast, it may be preferable to operate an ACK/NACK resource region in a manner of dividing the ACK/NACK resource region into several parts. This is because it is not easy to handle a multitude of UEs in a single resource region that is not divided. In FIG. 12, data is transmitted on a resource in 3 frequency units. If this data corresponds to broadcast or multicast, an ACK/NACK resource, e.g., a resource in 3 frequency units is divided into 3 parts with reference to a frequency axis so as to configure 3 ACK/NACK resource regions. And, UEs are separated for the resource regions, respectively. Thus, transmission can be performed in form of FDM.

Moreover, a time margin for an Rx UE to perform a receiving process is necessary between a data transmitted resource and an ACK/NACK transmitted resource. If such a time interval is defined as a time offset, an Rx UE can be informed of the time offset through control information interconnected to the transmitted data or by RRC signaling. Considering broadcast/multicast, it is possible to TDM an ACK/NACK resource Rx UEs will transmit in a manner of dividing ACK/NACK resource region by time. In this case, the time offset for a single ACK/NACK resource can be indicated through the control information or RRC signaling. And, the rest of the time offset may be operated as a predefined value.

Moreover, in broadcast/multicast, it may be inefficient to make a resource per Rx UE transmitting ACK/NACK. In aspect of performing a retransmission in case of a presence or 1 or more NACK rather than determining each ACK/NACK, it is necessary to know a presence or non-presence of a NACK transmitting UE among all Rx UEs. Therefore, an ACK/NACK transmitting method according to broadcast/multicast is described through a first or second embodiment of the present invention as follows.

First Embodiment

According to a first embodiment of the present invention, by allocating a single time/frequency resource region per 1 broadcast/multicast transmission, every UE receiving the transmission transmits ACK/NACK in the allocated resource region. And, every Rx UE uses the same sequence. In this case, if every UE transmits ACK and NACK distinctively, as the same resource region is shared with each other, an ACK signal and a NACK signal are mixed together. Hence, a Tx UE is unable to determine what a prescribed signal is. Hence, only if there is NACK, an Rx UE can perform a transmission. If so, signals of RX UEs transmitting NACKs are simultaneously performed. Even if there is a single NACK only, a signal is transmitted in an ACK/NACK resource region. The Tx UE determines whether the signal received in the ACK/NACK resource region is NACK or no transmission. If the signal is NACK, the Tx UE performs a retransmission. If the signal is no transmission, the Tx UE determines that every Rx UE is ACK and does not perform retransmission.

Method 1-1: When a Tx UE receives NAC transmissions of all Rx UEs in a single resource region, a reference signal is necessary in order to determine NACK or no transmission. A reference signal is mapped to a prescribed resource element in an ACK/NACK resource region. Only a UE transmitting a NACK signal among all Rx UEs transmits a reference signal. In this case, for the reference signal, all the NACK transmitting UEs preferably use the same sequence. Namely, since a channel of a NACK signal appears as a sum of channels of all UEs transmitting NACK, a reference signal for a NACK signal uses the same sequence to appear as a sum of channels of UEs.

Method 1-2: Unlike Method 1-1, a reference signal may not be sent for resource efficiency. In this case, a Tx UE needs a threshold value to determine whether a NACK Signal currently exists in an ACK/NACK resource. If a signal value is greater than the threshold value, NACK is determined as existing. If a signal value is smaller than the threshold value, a NACK signal is determined as not existing (i.e., ACK for all UEs). When Rx UEs on a range edge according to a transmission range of a service transmit NACKs, the threshold value should be adjusted enough to be recognized as NACK by the Tx UE. To this end, by applying ACK/NACK power control to each of reception ranges of Rx UEs (or, to each Rx UE), the NACK signal may maintain a value equal to or greater than a predetermined threshold value.

Or, Rx UEs may measure a power of data or control related signal of a Tx UE or a reference signal power and perform power control to have a value equal to or greater than a threshold value on transmitting NACK. Or, Rx UEs sound a reference signal of a Tx UE and may use it for NACK transmission by applying beamforming precoding.

A base station may inform UEs of such a threshold value through higher layer signaling (e.g., RRC signaling). Or, such a threshold value may be defined for each service in advance. Or, since a threshold value can be changed according to a device of a Tx UE, the Tx UE may directly indicate such a threshold value on a control channel such as PSCCH.

Method 1-3: Performance in Method 1-2 may be very sensitive according to a transmission range and a threshold. As another method, Rx UEs transmit NACK signals through Single Frequency Network (SFN) in form of comb. For example, assuming that an ACK/NACK resource region consists of resource elements 1, 2, 3 and 4, NACK signal is transmitted on 1 and 3 only but any signal is not transmitted on 2 and 4. A Tx UE compares a sum of signal strength of a resource element on which NACK signal will be transmitted with a sum of signal strength of a resource element on which NACK signal will not be transmitted. If the sum of the signal strength of the resource element on which the NACK signal will be transmitted is greater, the Tx UE regards that there exists NACK and is able to perform retransmission. Yet, if any one of Rx UEs has NACK, it is easy to detect NACK by such a method. On the other hand, if all Rx UEs have ACKs, it may be difficult to determine ACK. However, considering that NACK-to-ACK error is more problematic than ACK-to-NACK error, the present method is applicable.

Second Embodiment

In case of the first embodiment of the present invention, all Rx UEs transmitting NACK transmit the same NACK sequence, whereby a sum of channels of the UEs becomes a channel of all NACK signals. In this case, different channels of many UEs are mixed together, which may become a value close to zero. To prevent this, the second embodiment proposes to use N NACK sequences despite transmitting NACK in the same resource region. After N NACK sequences have been configured irrespective of the number of Rx UEs, a NACK sequence may be mapped to each of the Rx UEs. In this case, since the number of the NACK sequences is already determined irrespective of the number of the Rx UEs, a plurality of Rx UEs may be mapped to a single NACK sequence. This may become a method for preventing a signal close to zero in a manner that channels of all UEs are mixed with a signal received using a single NACK sequence only despite that Rx UEs share NACK sequences that are limited due to the possibility that the number of NACK sequences may be insufficient to map a single NACK sequence to each of a multitude of unspecific Rx UEs like broadcast.

The second embodiment of the present invention may be implemented by FDM or TDM. An ACK/NACK resource region is divided into several limited time-frequency regions and each of the regions is designed to be mapped to one or more Rx UEs, whereby each Rx UE transmits NACK in a time-frequency region associated with the corresponding Rx UE.

The second embodiment can use FDM or TDM together with CDM. An ACK/NACK resource region is divided into several limited time-frequency regions and a plurality of NACK sequences can be transmitted in each of the regions. And, it is designed to map each NACK sequence of each of the regions to one or more Rx UEs. Therefore, each of the Rx UEs can transmit NACK through the mapped NACK sequence in a time-frequency region associated with the corresponding Rx UE.

A plurality of the above-described time-frequency regions or a plurality of the above-described NACK sequences (or both), which will be mapped to an Rx UE, are determined through a Tx UE ID for the distinguishment from transmission of another Tx UE and each Rx UE ID is used for time-frequency region or NACK sequence determination.

Alternatively, a time-frequency region or an NACK sequence may be configured differently in each different reception power range. Each Rx UE can measure data transmission strength of a Tx UE, thereby mapping the above-described time-frequency region or NACK sequence (or both) to each range of a predetermined value. Namely, if any one UE sends NACK by checking NACKs from Rx UEs remote from a Tx UE, the Tx UE starts retransmission directly without checking the remaining ACK/NACK resource.

A base station measures data transmission strength of a Tx UE, thereby enabling Rx UEs in a range of a predetermined value to transmit NACK signals (or, other known signals). Thus, the base station can use them in performing transmission or retransmission by increasing MCS, resource size, or transmission count.

Method 2-1: A reference signal is mapped to a plurality of the above-described time-frequency regions in an ACK/NACK resource region or some resource elements in the whole resource region. Among all Rx UEs, only a UE transmitting a NACK signal transmits a reference signal. In this case, even for the reference signal, it is preferable that the reference signal uses the same sequence between NACK transmitting UEs among Rx UEs mapped to the same NACK sequence in the same time-frequency region (or the whole resource region). Namely, since a channel of a NACK signal appears as a sum of channels of all UEs transmitting NACKs using the same NACK sequence in the same time-frequency region (or the whole resource region), the same sequence is used for the reference signal among all Rx UEs transmitting NACKs using the same NACK sequence in the same time-frequency region (or the whole resource region) so that the reference signal for the NACK signal can appear as a sum of channels of UEs.

Method 2-2: Unlike Method 2-1, a reference signal may not be sent for resource efficiency. In this case, a Tx UE needs a threshold value to determine whether a NACK signal currently exists in an ACK/NACK resource. If a signal value is greater than the threshold value, the Tx UE determines that NACK exists. If the signal value is smaller than the threshold value, the Tx UE determines that there is no signal. A threshold value should be adjusted according to a transmission range of a service so as to enable a Tx UE to recognize NACK when Rx UEs located on a range edge transmits NACKs. A base station may inform UEs of such a threshold value through higher layer signaling (e.g., RRC signaling) or the like or be defined per service in advance. Or, since such a value may vary according to a device of a Tx UE, the Tx UE may directly indicate a threshold value on a control channel such as PSCCH.

Such a threshold value may be set to a value different per time-frequency region or NACK sequence described in the above. For example, in case of mapping Rx UEs in different reception power ranges to each time-frequency region or sequence, as each of the Rx UEs makes a mutually similar ACK/NACK reception strength, each of the Rx UEs may use a different threshold value. By applying ACK/NACK power control to each reception power range of Rx UEs (or each Rx UE), an ANCK signal can maintain a value equal to or greater than a predetermined threshold.

Or, Rx UEs may measure a strength of a data or control related signal of a Tx UE and perform power control in a manner that NACK can have a value equal to or greater than a threshold when the NACK is transmitted. Or, Rx UEs may sound a reference signal of a Tx UE and use it for NACK transmission by applying beamforming precoding thereto.

Method 2-3: performance in Method 2-2 may be very sensitive according to a transmission range and a threshold. As another method, each of Rx UEs can transmit a NACK signal for a single NACK sequence or each of a plurality of NACK sequences in a plurality of the above-described time-frequency regions, in form of a comb in a transmitted time-frequency region. For example, assuming that an ACK/NACK time-frequency region consists of resource elements 1, 2, 3 and 4, NACK signal is transmitted on 1 and 3 only but any signal is not transmitted on 2 and 4. A Tx UE compares a sum of signal strength of a resource element on which NACK signal will be transmitted with a sum of signal strength of a resource element on which NACK signal will not be transmitted. If the sum of the signal strength of the resource element on which the NACK signal will be transmitted is greater, the Tx UE regards that there exists NACK and is able to perform retransmission. Yet, if any one of Rx UEs has NACK, it is easy to detect NACK by such a method. On the other hand, if all Rx UEs have ACKs, it may be difficult to determine ACK. However, considering that NACK-to-ACK error is more problematic than ACK-to-NACK error, the present method is applicable.

Figure 13:
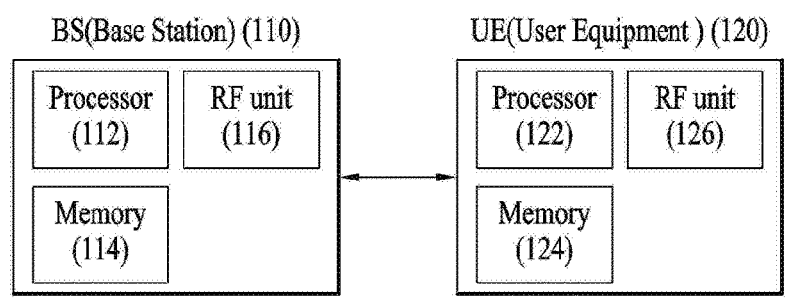
FIG. 13 shows a base station and a user equipment applicable to one embodiment of the present invention.

FIG. 13 illustrates a base station (BS) and a user equipment (UE) applicable to an embodiment of the present invention.

If a relay node is included in a wireless communication system, communication in a backhaul link is performed between the BS and the relay node and communication in an access link is performed between the relay node and the UE. Therefore, the BS or UE shown in the drawing can be substituted with the relay node in some cases.

Referring to FIG. 12, a wireless communication system includes a base station (BS) 110 and a user equipment (UE) 120. The base station 110 includes a processor 112, a memory 114 and an RF (radio frequency) unit 116. The processor 112 can be configured to implement the procedures and/or methods proposed in the present invention. The memory 114 is connected to the processor 112 and stores various kinds of information related to operations of the processor 112. The RF unit 116 is connected to the processor 112 and transmits and/or receives radio or wireless signals. The user equipment 120 includes a processor 122, a memory 124 and an RF unit 126. The processor 122 can be configured to implement the procedures and/or methods proposed in the present invention. The memory 124 is connected to the processor 122 and stores various kinds of information related to operations of the processor 122. The RF unit 126 is connected to the processor 122 and transmits and/or receives radio or wireless signals. The base station 110 and/or the user equipment 120 can have a single antenna or multiple antennas.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

In this disclosure, a specific operation explained as performed by a base station can be performed by an upper node of the base station in some cases. In particular, in a network constructed with a plurality of network nodes including a base station, it is apparent that various operations performed for communication with a user equipment can be performed by a base station or other network nodes except the base station. In this case, 'base station' can be replaced by such a terminology as a fixed station, a Node B, an eNodeB (eNB), an access point and the like.

The embodiments of the present invention may be implemented using various means. For instance, the embodiments of the present invention may be implemented using hardware, firmware, software and/or any combinations thereof.

In case of the implementation by hardware, one embodiment of the present invention may be implemented by at least one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention may be implemented by modules, procedures, and/or functions for performing the above-explained functions or operations. Software code may be stored in a memory unit and may be then driven by a processor.

The memory unit may be provided within or outside the processor to exchange data with the processor through the various means known to the public.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

As mentioned in the foregoing description, a method of transmitting a signal for V2X communication in a wireless communication system and apparatus therefor are applicable to various wireless communication systems.

What is claimed is:

1. A method of transmitting a Vehicle-to-Everything (V2X) signal by a first user equipment (UE) in a wireless communication system, the method comprising:
    transmitting, to a plurality of UEs including a second UE and a third UE, the V2X signal in a transmission resource;
    receiving, from the second UE, first Hybrid automatic repeat request Acknowledgement (HARQ-ACK) information in response to the V2X signal in a first ACK/NACK resource among ACK/NACK resources; and
    receiving, from the third UE, second HARQ-ACK information in response to the V2X signal in a second ACK/NACK resource among the ACK/NACK resources,
    wherein a number of the ACK/NACK resources is determined based on a number of frequency resource regions in the transmission resource,
    wherein the first ACK/NACK resource is determined for the second UE based on an ID of the first UE, an ID of the second UE, and the number of the ACK/NACK resources,
    wherein the second ACK/NACK resource is determined for the third UE based on the ID of the first UE, an ID of the third UE, and the number of the ACK/NACK resources, and
    wherein a first frequency region of the first ACK/NACK resource and a second frequency region of the second ACK/NACK resource are different from each other.

2. The method of claim 1, wherein the plurality of the UEs are configured to transmit a reference signal using N NACK sequences, and wherein N is a natural number.

3. The method of claim 1, wherein beamforming precoding based on a sounding of the V2X signal is applied to the first and second HARQ-ACK information.

4. The method of claim 1, wherein the V2X signal is a V2X data channel transmitted based on a V2X control channel, and
    wherein the transmission resource is a transmission resource for the V2X data channel.

5. The method of claim 1, the method comprising:
    receiving, from the second UE and the third UE, the first HARQ-ACK information and the second HARQ-ACK information in a same frequency region,
    wherein the first HARQ-ACK information and the second HARQ-ACK information are configured to include only Negative ACK.

6. A first user equipment (UE) transmitting a Vehicle-to-Everything (V2X) signal in a wireless communication system, the first UE comprising:
    a radio frequency unit; and
    a processor operatively coupled to the radio frequency unit,
    wherein the processor is configured to control signal transmission/reception, and is further configured to:
        transmit, to a plurality of UEs including a second UE and a third UE, the V2X signal in a transmission resource,
        receive, from the second UE, first Hybrid automatic repeat request Acknowledgement (HARQ-ACK) information in response to the V2X signal in a first ACK/NACK resource among ACK/NACK resources; and
        receive, from the third UE, second HARQ-ACK information in response to the V2X signal in a second ACK/NACK resource among the ACK/NACK resources,
    wherein a number of the ACK/NACK resources is determined based on a number of a frequency resource regions in the transmission resource,
    wherein the first ACK/NACK resource is determined for the second UE based on an ID of the first UE, an ID of the second UE, and the number of the ACK/NACK resources,
    wherein the second ACK/NACK resource is determined for the third UE based on the ID of the first UE, an ID of the third UE, and the number of the ACK/NACK resources, and
    wherein a first frequency region of the first ACK/NACK resource and a second frequency region of the second ACK/NACK resource are different from each other.

7. The first UE of claim 6, wherein the V2X signal is a V2X data channel transmitted based on a V2X control channel, and
    wherein the transmission resource is a data channel transmission resource.

8. The first UE of claim 6, the processor is configured to:
    receive, from the second UE and the third UE, the first HARQ-ACK information and the second HARQ-ACK information in a same frequency region,
    wherein the first HARQ-ACK information and the second HARQ-ACK information are configured to include only Negative ACK.

* * * * *